(12) United States Patent
Bertin et al.

(10) Patent No.: US 7,814,527 B2
(45) Date of Patent: Oct. 12, 2010

(54) DEVICE AND PROCESS FOR PAIRING A MASTER DECODER AND SLAVE DECODERS AND RECEPTION SYSTEM INCORPORATING SAID DEVICE

(75) Inventors: Jean-Pierre Bertin, Guemene-Penfao (FR); Claude Rambault, Saint Sulpice la Foret (FR); Denis Crespel, Gosne (FR)

(73) Assignee: Thomson Licensing, Boulogne-Billancourt (FR)

( * ) Notice: Subject to any disclaimer, the term of this patent is extended or adjusted under 35 U.S.C. 154(b) by 1218 days.

(21) Appl. No.: 11/393,594

(22) Filed: Mar. 30, 2006

(65) Prior Publication Data

US 2006/0238387 A1   Oct. 26, 2006

(51) Int. Cl.
*H04N 7/16* (2006.01)
(52) U.S. Cl. ........................ 725/139; 725/140
(58) Field of Classification Search .......... 725/139–140
See application file for complete search history.

(56) References Cited

U.S. PATENT DOCUMENTS 4,633,309 A    12/1986  Li et al.
5,933,192 A *   8/1999  Crosby et al. .......... 375/240.25

FOREIGN PATENT DOCUMENTS

EP           1 558 035 A1   7/2005
WO    WO 2004/038965      5/2004

OTHER PUBLICATIONS

European Telecommunications Satellite Organization: "DiSEqC Version 4.0—Bus Functional Specification" Technical Recommendations for Manufacturers of DTH and SMATV Receiing Euqipment, 232 Mars 1996 XP002149629 *le document en entier*.
Search Report Copy Dated Jan. 13, 2006.

* cited by examiner

*Primary Examiner*—Hunter B. Lonsberry
(74) *Attorney, Agent, or Firm*—Robert D. Shedd; Paul P. Kiel; Guy H. Eriksen

(57) ABSTRACT

The invention relates to a circuit and a method for pairing decoders enabling, with the use of a switch controlled by a processor, to create a communication link successively between a master decoder and each of the slave decoders, without any particular addressing, or cascaded filters.

12 Claims, 3 Drawing Sheets

DEVICE AND PROCESS FOR PAIRING A MASTER DECODER AND SLAVE DECODERS AND RECEPTION SYSTEM INCORPORATING SAID DEVICE

This application claims the benefit, under 35 U.S.C. §119, of French Patent Application No. 0550933 filed 12 Apr. 2006.

BACKGROUND OF THE INVENTION

1. Field of the Invention

The invention relates to a pairing device between decoders divided into one master decoder and slave decoders as well as a process enabling this pairing. The invention also relates to a satellite reception system including this device.

Multimedia service operators distribute their services according to several transmission networks. Among these networks, the satellite, cable and digital terrestrial distribution networks can be cited. These different distribution networks have in common the specific feature of bringing data flows to a device, entry point of the network, in the home. The services are then distributed in the home to different areas where the subscriber wants to be able to receive them. The reception itself is carried out by means of device called a digital decoder whose function is to check the access rights of the subscriber to the services and to decode those services for which the subscriber has rights.

In his home, the subscriber often has several receivers capable of displaying the services distributed. The problem then arises of enabling the subscriber to decode the services to which he has subscribed, in several areas of the home. The distribution of the decoded service downstream from the decoder, called master decoder, is one solution. If you want to allow each point of visualisation of the service in the home to display any service independently from the services displayed on the other points of visualisation, several decoders must be used in the home, that is one decoder per point of visualisation, each decoder being able to decode any of the services independently from the services decoded by the other decoders in the home. To achieve this, it is thus possible to use several decoders, called slaves, in the home.

The pairing between a master decoder and several slave decoders requires a pairing accessory circuit 3 situated in the reception system comprising an antenna 1, a receiver block called an LNB (Low Noise Block) 2 and connected to the decoders, as shown in FIG. 1. It sets up a communication link between the different master 5 and slave 6, 7, 8 decoders.

2. Description of the Prior Art

Such a circuit is known in the prior art. The patent FR 0213460 describes this circuit shown in FIG. 2. This coupling circuit 100 comprises two inputs/outputs of signals I/O3 and I/O4 designed to be connected to the decoders 5, 6. It also comprises at least two inputs/outputs I/O1 and I/O2 designed to be connected respectively to the LNB block 2 associated with the antenna 1. A band-pass filter 150 links the first inputs/outputs of signals I/O3 and I/O4 between each other, enabling a connection limited to a communication band frequency to be realised, for the dialogue between the different master 5 and slave 6 decoders. The inputs/outputs I/O1 and I/O2 are connected respectively to the inputs/outputs of the signals I/O3 and I/O4 by means of band rejector filters 101 and 102 that reject the frequency band corresponding to the communication channel used by the decoders.

Such a coupling device can be extended to N inputs/outputs. Each addition of a pair of inputs/outputs adds a band-pass filter 150 and a band rejector filter 103, as shown by the dotted lines.

The UHF-VHF signals received by antennas 1 then sent to the circuit on inputs I/O1, I/O2 are then sent to the decoders connected to the inputs/outputs I/O3, I/O4.

The decoders connected to the inputs/outputs I/O3, I/O4, are controlled by exchanging data on the communication channel between the master decoder connected to one of the outputs and the slave decoders connected to the other outputs. The signals sent by this master decoder to organise the control of the other decoders called slaves are signals in a frequency band not disturbing the reception.

However, such a control of the slaves has many disadvantages, particularly when the number of slave decoders is large. Indeed, all the slave decoders are permanently connected by means of filters 150, to the master decoder.

The master decoder will therefore dialogue with all the slave decoders to create a pairing link between itself and one of the slave decoders. Only the slave decoder corresponding to the address sent will reply. But a risk of collision and multiple interference arises from this collective addressing.

Moreover, the slave furthest away from the master will be connected by means of many cascaded filters. The data sent by the master will therefore be greatly attenuated.

SUMMARY OF THE INVENTION

The invention proposes a solution authorising the successive pairing between at least two decoders by means of the pairing circuit. It enables slave decoders to be switched successively to a master decoder, thus realising master—slave connection. All collisions and multiple interferences due to the collective addressing are thus prevented. The pairing circuit thus enables these successive switching operations to be controlled.

Hence, the invention is a pairing device between N (N≧3) decoders comprising at least three first inputs/outputs of signals designed to be sent to these decoders by the second inputs/outputs. The decoders are divided up into a decoder called a master decoder connected to second main input/output and N−1 decoders called slave decoders connected to N−1 secondary inputs/outputs respectively.

It comprises at least one communication means associated with each secondary input/output and a switching means enabling the switching of one of the secondary inputs/outputs N−1 to the main input/output in a communication frequency band, thus enabling the links between the master decoder and the N−1 slave decoders to be controlled.

This solution has the advantage of linking the master decoder to each slave decoder by only one filter, resulting in a low attenuation of the communication data.

In one embodiment of the circuit according to the invention, the switching means comprises a switch with at least N positions associated with a processor complying with the DiseqC protocol and controlling the switch. The N positions of the switch more particularly comprise a released position.

In one embodiment the communication means is a band-pass filter whose bandwidth corresponds to the communication frequency band.

According to one characteristic of the invention, every second input/output is connected to a first input/output by means of a rejector filter that rejects the communication frequency band.

The invention also proposes a satellite programme reception device comprising at least the pairing device, one master decoder and at least one slave decoder, the device and the decoders being fitted with processors.

The invention also proposes a pairing process between N decoders, connected by inputs/outputs to a pairing device, and divided up into a decoder called master decoder connected to a main input/output and N−1 decoders called slave decoders connected to N−1 secondary inputs/outputs.

It comprises successive steps between the master decoder and the data exchange pairing device to switch the master decoder successively with each of the slave decoders so as to create a communication link successively between the master decoder and each of the slave decoders.

According to one process according to the invention, the master decoder generates the successive data exchange steps and the pairing device executes the successive switching operations of the master decoder with each of the slave decoders.

According to one particular process, the data exchanged between the master decoder and the slave decoder will comprise the record, connection and information data used to validate the slave decoder.

According to a certain process, the steps of switching the master decoder successively with each of the slave decoders will be sequential, such that the master decoder can dialogue continually with each of the slave decoders.

According to one characteristic of the process, the steps of switching the master decoder successively with each of the slave decoders will be determined by a clock and are repeated at regular intervals of time.

According to one particular process, the steps of switching the master decoder successively with each of the slave decoders will also occur when the master decoder is in a state known as a standby state.

BRIEF DESCRIPTION OF THE DRAWINGS

The invention will be better understood, and other specific features and advantages will emerge from reading the following description, the description making reference to the annexed drawings wherein.

In the present description, the same references are used to designate the same elements or similar elements.

DESCRIPTION OF THE PREFERRED EMBODIMENTS

Figure 1:
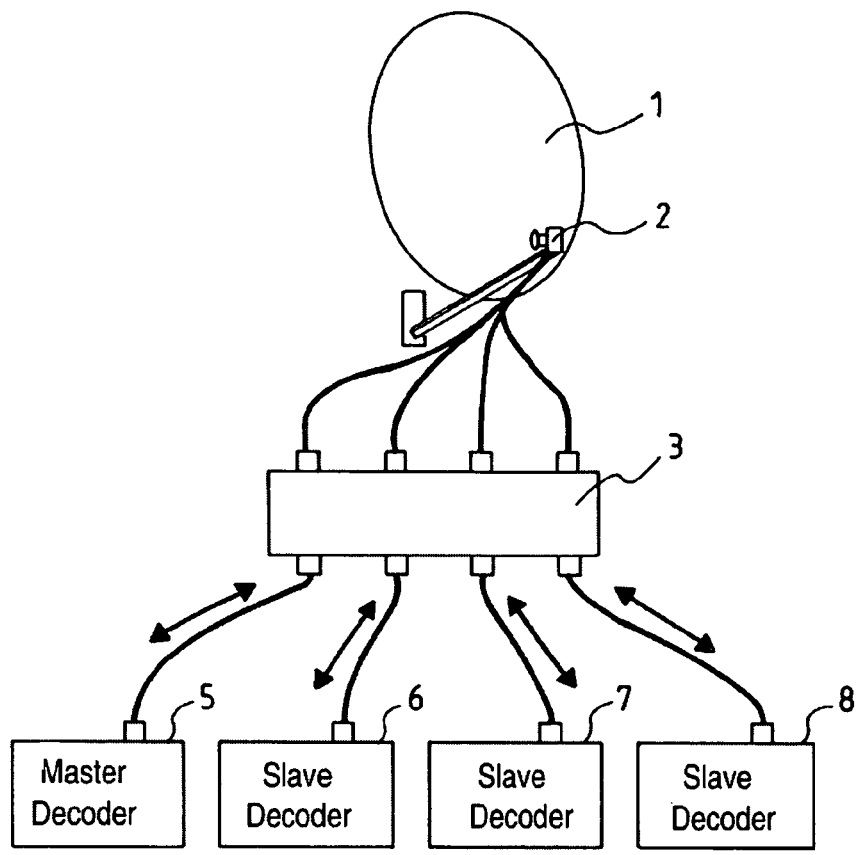
FIG. 1 shows a satellite reception system using several decoders, and enabling the circuit to be situated in the reception system.
Figure 2:
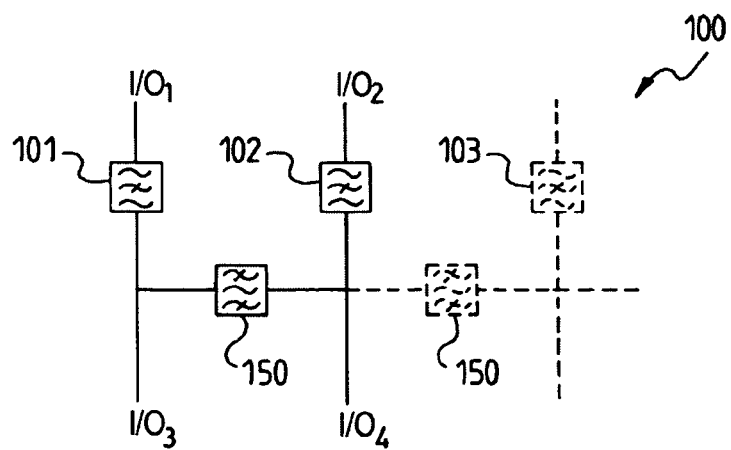
FIG. 2 shows a multiple output conversion block according to the prior art.
Figure 3:
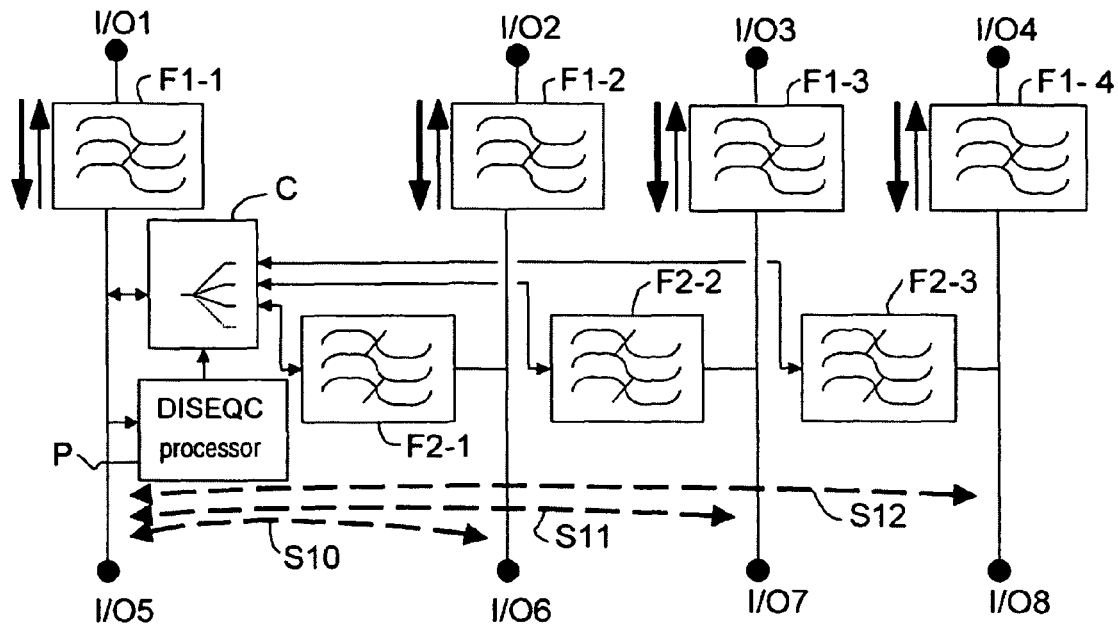
FIG. 3 shows a block diagram of the pairing circuit according to the invention.

FIG. 3 shows a block diagram of the pairing circuit according to the invention. It comprises band-pass filters F2-1, F2-2, F2-3 connected to the inputs/outputs I/O6, I/O7, I/O8 connected to the slave decoders. They filter the pairing signal in a communication frequency band, for example 1 MHz.

Other rejector filters F1-1, F1-2, F1-3, F1-4 are placed between the corresponding inputs/outputs of the pairing circuit I/O1 and I/O5, I/O2 and I/O6, I/O3 and I/O7, I/O4 and I/O8. These filters reject the communication frequency band, thus prohibiting the transmission of the communication signal to the LNBs.

A switch C is connected by its input to the master decoder 5 and by these outputs to the various slave decoders 6, 7, 8 by means of the band-pass filters F2-1, F2-2, F2-3. A released output is also provided. It is used to switch the input connected to the master decoder either with an output connected to one of the slave decoders thus creating successively the communication links S10, S11, and S12 also described in the following figure, or with the released output. A microprocessor generates the switch control signal. It is connected to the microprocessor of the master decoder and exchanges data with this decoder according to the norms of the DiseqC protocol enabling the switch to be controlled.

Figure 4:
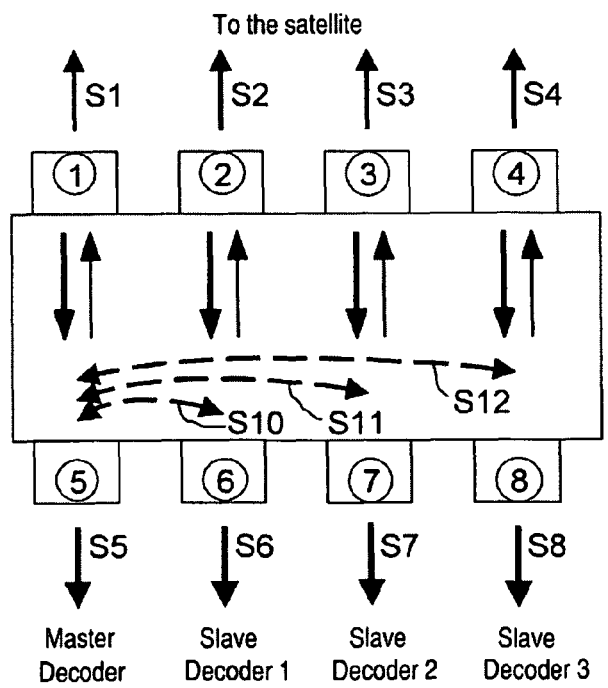
FIG. 4 shows the signal flows crossing the circuit as claimed.

FIG. 4 shows the signal flows crossing the circuit as claimed.

The signals S1, S2, S3, S4 are signals supplied by the decoders, modulated at 22 kHz according to the DiseqC protocol and carried by a continuous component to ensure the polarisation of the LNB.

The S5, S6, S7, S8 signals are signals transmitted by the LNB circuit and received by the decoders in the VHF-UHF band.

The signals S10, S11, S12 are the communication signals enabling the pairing of the master and slave decoders. They are sent in a communication frequency band not interfering with the reception and emission of the broadband signals S1 to S8 described above.

Figure 5:
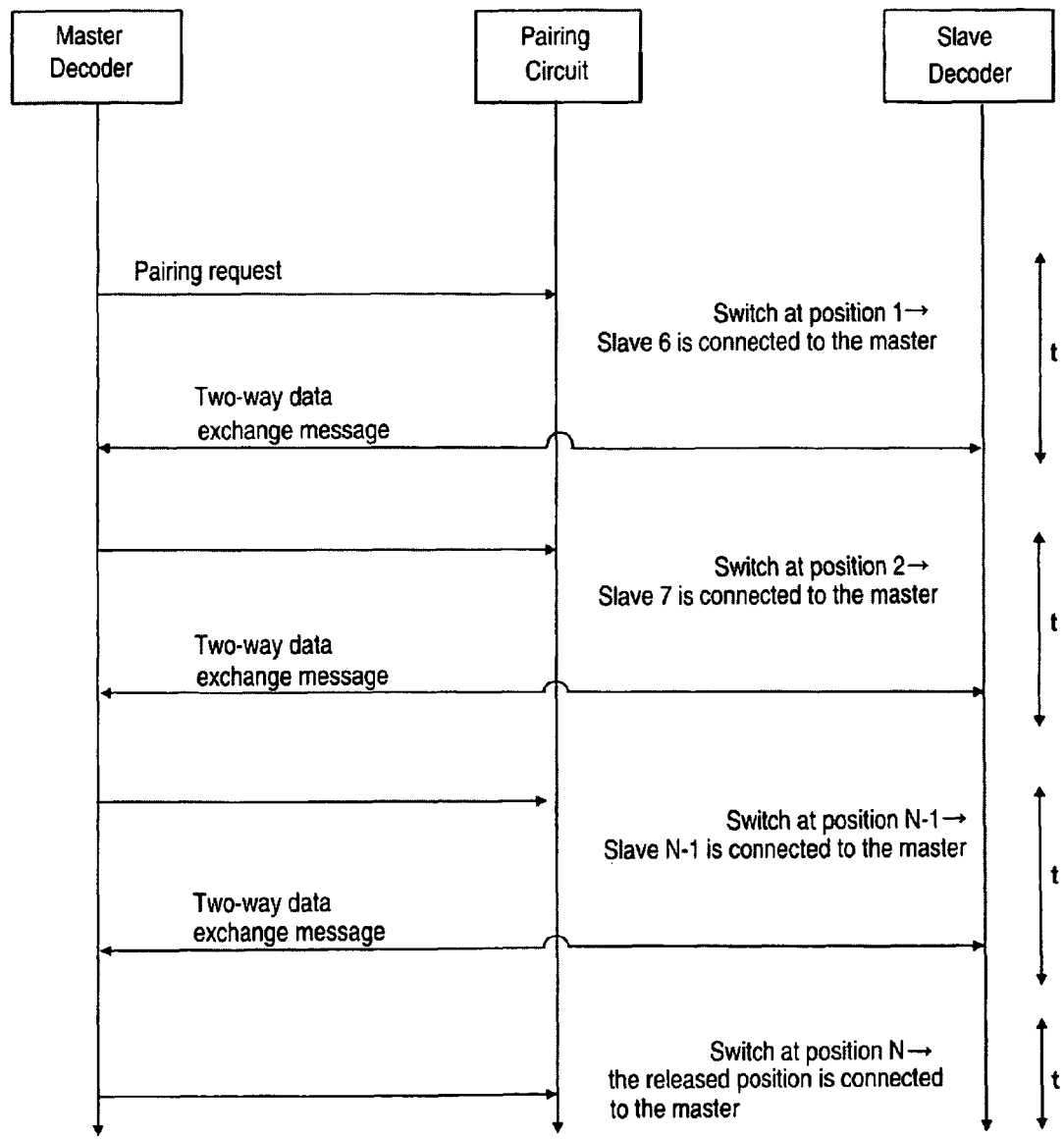
FIG. 5 is a diagram showing the principle of the successive switching operations between the master decoder and the slave decoders.

The principle of the switching, according to the invention, of a slave to the master thus creating a communication link between this slave and the master will be better understood with the help of the diagram according to FIG. 5.

The master decoder sends the microprocessor P of the pairing circuit a pairing request by a command according to the DiseqC protocol. The response of the processor P is to send a command to the switch C positioning the switch to a first position. A communication link between the master and the slave connected to this switched output is then established. The master decoder and the slave decoder can thus exchange the record, connection and information data allowing or disallowing the validation of the slave decoder to receive the S6 data coming from the antenna.

The switch C will then be set to the next position establishing a communication line between the master decoder and the slave decoder connected to this second output. Likewise, the master decoder and the slave decoder can then exchange the record, connection and information data allowing or disallowing the validation of the slave to receive the S7 data coming from the antenna.

In a successive manner, the switch will then be set to the next position, establishing a communication between the master and the slave connected to the next output. The master and each of the slaves connected to the outputs of the switch can then exchange the record, connection and information data.

Finally, the switch will then be set to the released position, thus indicating that a switching operation with all the decoders connected has taken place. The switch will then be at the first position 1 again and the successive switching process will continue.

This successive switching of the different outputs of the switch on its input is determined by a clock enabling, for example, a new switching operation every 500 ms. The master will therefore communicate regularly and successively with each of the slaves, thus responding to any possible change in parameters of one of the slaves having repercussions on its ability to receive data coming from the antenna. The switching cycle will be in the order of a few seconds for example. A single band-pass filter will always be in the communication link thus avoiding a large loss of power. The addressing of the slave decoders by the master decoder for a possible connection is unnecessary as all the slave decoders are automatically and successively connected to the master.

This successive switching will continue even if the master decoder is in a standby state, thus enabling the monitoring of any change in parameters of all the slave decoders.

The invention described here within the framework of decoders is not limited only to this framework nor to the protocol described. Indeed, this type of protocol or another can be implemented in any type of domestic device as soon as several devices are capable of being connected enabling communication to be established. One device will play the role of master decoder and the others slave decoders. A slave device will only be able to function provided that it regularly exchanges information with its master. The switching operations between master and slaves can be made by means of other switches such as purely electronic switches or switches integrated into an electronic circuit. The rate and period of the switching operations can be varied according to different parameters depending possibly on the length of the data exchanges or more particularly on the protocol or protocol version. Any decoder can assume the function of either a master decoder or a slave decoder. The number of slave decoders is unlimited.

The invention claimed is:

1. Pairing device between N decoders comprising at least three first inputs/outputs of signals intended to be sent by at least three second inputs/outputs to decoders divided up into a decoder called master connected to a main input/output and N-1 decoders called slaves connected respectively to N-1 second inputs/outputs
    wherein it comprises at least one communication means associated with each second input/output and
        a switching means used to successively connect the N-1 slave decoders to the master decoder by successively connecting the N-1 secondary inputs/outputs to the main input/output in a communication frequency band so as to create a communication link successively between the master decoder and each of the N-1 slave decoders.

2. Pairing device between N decoders according to claim 1, characterized in that the switching means comprises a switch with at least N positions and a processor controlling the switch.

3. Pairing device between N decoders according to claim 2, wherein the at least N positions of the switching means comprises a released position.

4. Pairing device between N decoders according to claim 1, wherein the communication means is a band-pass filter whose bandwidth corresponds to the communication frequency band.

5. Device according to claim 1, wherein it comprises N inputs/outputs of signals intended to be connected to N separate decoders, each second input/output being connected to a first input/output by means of a rejector filter that rejects the communication frequency band.

6. Reception system comprising the pairing device as claimed in claim 1, a master decoder and at least two slave decoders, the device and the decoders being equipped with processors.

7. Pairing process between N decoders connected by inputs/outputs to a pairing device, and divided into a decoder called master decoder connected to a main input/output and N-1 decoders called slave decoders connected respectively to N-1 second inputs/outputs
    wherein it comprises successive steps of data exchanges between the master decoder and the pairing device to connect the master decoder successively with each of the slave decoders so as to create a communication link successively between the master decoder and each of the slave decoders.

8. Pairing process according to claim 7 characterized in that the successive steps of data exchanges are generated by the master decoder and the successive connections of the master decoder with each of the slave decoders are executed by the pairing device.

9. Pairing process according to claim 8, characterized in that the data exchanged between the master decoder and the slave decoder comprise record, connection and information data used to validate the slave decoder.

10. Pairing process according to claim 9, characterized in that the successive steps of data exchange to connect the master decoder successively to each of the slave decoders are sequential, such that the master decoder can dialogue continuously with each of the slave decoders.

11. Pairing process according to claim 10 characterized in that the successive steps of data exchange to connect the master decoder successively to each of the slave decoders are determined by a clock and are repeated at regular intervals of time.

12. Pairing process according to claim 10, characterized in that the successive steps of data exchange to connect the master decoder successively to each of the slave decoders occur when the master decoder is in a state known as a standby state.

* * * * *